United States Patent
Dhawan et al.

(10) Patent No.: US 10,528,980 B2
(45) Date of Patent: Jan. 7, 2020

(54) TARGETED MARKETING USING DYNAMICALLY VARIED RECOMMENDATIONS

(71) Applicant: Adobe Inc., San Jose, CA (US)

(72) Inventors: Anmol Dhawan, Uttar Pradesh (IN); Vineet Sharma, Draper, UT (US); Ashish Duggal, Delhi (IN); Sachin Soni, New Delhi (IN)

(73) Assignee: Adobe Inc., San Jose, CA (US)

( * ) Notice: Subject to any disclaimer, the term of this patent is extended or adjusted under 35 U.S.C. 154(b) by 737 days.

(21) Appl. No.: 14/299,919

(22) Filed: Jun. 9, 2014

(65) Prior Publication Data

US 2015/0356622 A1    Dec. 10, 2015

(51) Int. Cl.
*G06Q 30/00* (2012.01)
*G06Q 30/02* (2012.01)

(52) U.S. Cl.
CPC ................ *G06Q 30/0269* (2013.01)

(58) Field of Classification Search
None
See application file for complete search history.

(56) References Cited

U.S. PATENT DOCUMENTS

| | | | | |
|---|---|---|---|---|
| 5,966,535 A * | 10/1999 | Benedikt | ................. | G06F 8/436 707/999.01 |
| 6,094,684 A * | 7/2000 | Pallmann | .................. | G06F 9/54 709/227 |
| 7,756,887 B1 | 7/2010 | Haveliwala | | |
| 2003/0174818 A1 * | 9/2003 | Hazenfield | ............ | H04M 3/428 379/88.22 |
| 2006/0059042 A1 * | 3/2006 | Zohar | ..................... | G06Q 30/02 705/14.46 |
| 2010/0106703 A1 * | 4/2010 | Cramer | ............. | G06F 17/30867 707/706 |
| 2011/0074718 A1 * | 3/2011 | Yeh | ........................ | G06F 3/0482 345/173 |
| 2012/0116875 A1 * | 5/2012 | Wang | ..................... | G06Q 30/02 705/14.53 |

(Continued)

OTHER PUBLICATIONS

Rosenbush, "Facebook Tests Software to Track Your Cursor on Screen," The CIO Report, Wall Street Journal (WSJ.com), Oct. 30, 2013.

*Primary Examiner* — Bennett M Sigmond
*Assistant Examiner* — Scott C Anderson
(74) *Attorney, Agent, or Firm* — Finch & Maloney PLLC

(57) ABSTRACT

Techniques are disclosed for presenting recommended marketing content that can be dynamically varied (e.g., in real time or near-real time) based on the particular content of a web page that a user is currently reading, the content that the user has previously read, or a combination of these factors. For example, the current interactions of a user with content of a web page, such as scroll position or eye fixation, can be used to identify which portion or portions of the web page content the user is currently reading and which portions of the web page content the user is skimming or skipping over. Keywords can then be generated based on the content in those portions of the web page that the user is currently reading. Next, recommended marketing content corresponding to the keywords can be retrieved and presented to the user.

20 Claims, 4 Drawing Sheets

(56) References Cited

U.S. PATENT DOCUMENTS

2014/0095294 A1* 4/2014 Vick ................. G06Q 30/0266
                     705/14.43
2014/0280251 A1* 9/2014 Somekh ............ G06F 17/30867
                     707/754

* cited by examiner

TARGETED MARKETING USING DYNAMICALLY VARIED RECOMMENDATIONS

FIELD OF THE DISCLOSURE

This disclosure relates to the field of data processing, and more particularly, to techniques for targeted marketing using dynamically varied recommendations.

BACKGROUND

Many websites feature advertisements for products and services that are positioned alongside other content of a web page. In some cases, the ads can be related to the subject matter of the web page. For example, a web page about a tourist destination may include ads for shops, restaurants and other attractions at or near that destination. In these cases, the advertising is determined primarily by the content of the website and all visitors to the website will see the same ads. In some other cases, tracking software, such as cookies, can be used to generate a profile of a particular user as that user browses various websites. The profile may, for example, describe which web pages the user visited, as well as when and how often those pages were visited. This profile can in turn be used to target that particular website visitor with ads that are relevant to the perceived interests of the visitor, based on the content of the web pages that visitor previously viewed. However, these techniques only take into account the content of the entire web page. Furthermore, any targeted advertising only appears during subsequent visits or page loads, which may occur over a period of hours, days or even months. Thus, the ads may not be of immediate interest to a visitor who is actively seeking specific information about a certain subject, and consequently such targeted ads are often ignored.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
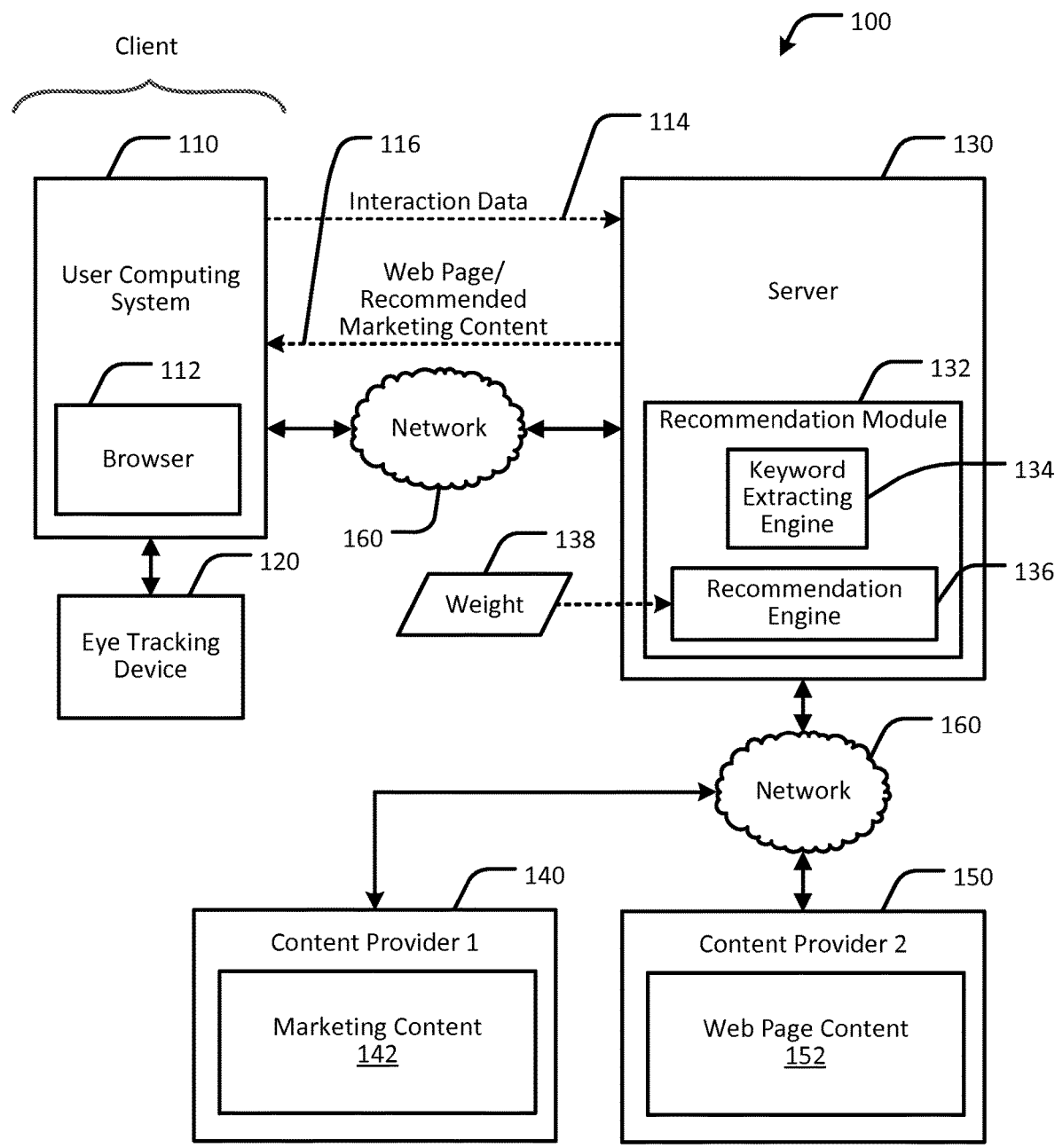
FIG. 1 illustrates an example client-server system for targeted marketing using dynamically varied recommendations, in accordance with an embodiment of the present invention.

Behavioral targeting techniques can be used by marketers to help increase the effectiveness of their campaigns through the use of information about visitor interactions with a website. For example, when a user visits a website, information can be collected about the pages visited, the amount of time spent viewing each page, the hyperlinks selected, the searches performed, the items interacted with, and other factors. Marketers and advertisers can use this information to target consumers who exhibit characteristics that indicate they would be more likely to positively respond to the online advertisements and offers. For instance, the information can be used to position advertisements on web pages visited by those consumers who exhibit a greater level of interest and intent for the products and services being offered. However, prior behavioral targeting techniques suffer from certain disadvantages, including the inability to identify the consumer's current state of mind with a high degree of confidence. As a result, such techniques sometimes lead to the presentation of advertisements that are not of particular or immediate interest to the consumer, which can, among other things, reduce the so-called click-through rate (CTR) for the ad.

To this end, and in accordance with an embodiment of the present invention, techniques are disclosed for targeted marketing using dynamically varied recommendations. In particular, an example embodiment of the present invention is directed to a methodology for presenting recommended marketing content that can be dynamically varied (e.g., in real time or near-real time) based on the particular content of a web page that a user is currently reading, the content that the user has previously read, or a combination of these factors. The current interactions of the user with content of a web page, such as scroll position or eye fixation, can be used to identify which specific portion or portions of the web page content the user is currently reading and which portions of the web page content the user is skimming or skipping over. Keywords can then be generated based on the content in those portions of the web page that the user is currently reading. Next, recommended marketing content corresponding to the keywords can be retrieved and presented to the user. As will be appreciated in light of this disclosure, such techniques effectively enhance the resolution of targeted marketing and can be used to address a given user's immediate interests with relatively high confidence. Prior targeted marketing techniques lack such resolution. Numerous configurations and variations will be apparent in light of this disclosure.

As used in this disclosure, the term "recommended marketing content" includes ads, articles, offers, or any other type of information that can be obtained or generated for, among other things, soliciting sales of products or services via an electronic medium, such as a website. The recommended marketing content can include information that is specifically chosen or prepared for presentation to a particular user in response to observations about the user's current or prior interactions with online content, such as found in a web page or other electronic document (e.g., a word processing document, a Portable Document Format (PDF) document, etc.). Particularly, in some embodiments, the marketing content can be recommended for presentation based on web page content that the user is attentively reading, as opposed to content that is being skimmed or ignored, under the presumption that such attentiveness infers a particular interest in the subject matter by the user. For example, if a user is carefully reading only Section 2 of a three-section document, the recommended marketing content may include information that is specifically related to the content of Section 2, as opposed to the content of Sections 1 or 3, because the user's attention to Section 2 indicates a particular interest in that section. Such recommended marketing content may then be presented or displayed to the user while the user is reading the related content or at some point thereafter. In some cases, the recommended marketing content can include information related to other subject matter in combination with the content the user is currently reading. Other examples will be apparent in light of this disclosure.

As used in this disclosure, the terms "content" and "multimedia content" include audio, video, still photographs, data, graphics, or any other information that can be identified, addressed, referenced or handled in any networked information system, such as the World Wide Web, or any information that can be delivered from a publisher to an end-user via physical media, such as a portable USB drive, CD, DVD or Blu-ray disc. In general, content includes any form of information in digital form; however, content may be embodied in non-digital forms (e.g., analog) or a combination of digital and non-digital forms. The term "video," as used herein, is intended to include all types of multimedia content.

As used in this disclosure, the term "interaction" includes any input received by a computer from a user. For example, an interaction may include a mouse click or click-and-drag input (e.g., pressing one of the mouse buttons while the mouse pointer is at a certain location within a graphical user interface), a mouse hover input (e.g., placing the mouse pointer over a certain location for a certain amount of time), a keyboard entry, a touch input on a touch-sensitive screen (e.g., detecting a finger touching the screen at a certain location), and an eye fixation input (e.g., detecting a user's eye looking at a certain location or region of a graphical user interface for a certain amount of time). Other examples will be apparent in view of this disclosure.

An example embodiment for targeted marketing using dynamically varied recommendations is directed toward a method for determining and dynamically changing the targeted advertisement or recommendation displayed on an e-commerce website, or in an article or e-mail, based on what portion of web page content the user is currently reading. Another example embodiment is directed toward a method for determining and dynamically changing the targeted advertisement or recommendation displayed on an e-commerce website, or in an article or e-mail, based on what portion(s) of web page content the user has been actually or carefully reading combined with what portion of the content the user is currently reading. Yet another example embodiment is directed toward a method for determining and dynamically changing the targeted advertisement or recommendation displayed on an e-commerce website, or in an article or e-mail, by giving more weight to the keywords corresponding to the content that the user is currently reading. Yet another example embodiment is directed toward a method for determining and dynamically changing the targeted advertisement or recommendation displayed on an e-commerce website, or in an article or e-mail, by giving more weight to the keywords corresponding to web page content that the user has been actually or carefully reading combined with what portion of the content the user is currently reading.

Example System

FIG. 1 illustrates an example client-server system 100 for targeted marketing using dynamically varied recommendations, in accordance with an embodiment. The system 100 includes one or more user computing systems 110, one or more servers 130, and one or more content providers 140, 150, each electronically interconnected via a network 160 (e.g., a wide area network, such as the Internet, or a local area network). Generally, the user computing system 110, server 130, and content providers 140, 150 can include any type of computing device, such as a personal computer (PC), tablet, or smart phone, configured to send and receive data to and from each other. The user computing system 110 can include a browser 112, and in some cases can be operatively connected to an eye tracking device 120, as will be discussed in further detail below, or other user input device, such as a keyboard, mouse, touchpad/touchscreen, voice command input device, etc. The eye tracking device 120 may, for example, include any device that is configured to determine where on a display (e.g., x, y screen coordinates) the user's eyes are fixated. One non-limiting example of an eye tracking device that may be used in conjunction with various embodiments is the Readalyzer™ by Bernell Corporation of Mishawaka, Ind. Other user input devices can be used to identify, for example, the location of a cursor, a window scroll position with respect to content displayed to the user, or other combination of inputs. The server 130 can include a recommendation module 132, having a keyword extracting engine 134 and a recommendation engine 136, for obtaining or generating recommended marketing content 116 based, at least in part, on interaction data 114 received from the user computing system 110, such as described in further detail below. The content providers 140, 150 can provide marketing content 142 and web page content 152 for presentation to a user via the user computing system 110. While FIG. 1 depicts the marketing content 142 and web page content 152 as passing to the user computing system 110 via the server 130, it will be understood that in some embodiments the marketing content 142, the web page content 152, or both, may be provided via other communication channels not specifically including the server 130.

By way of example, the web page content 152 can be presented to a user via the browser 112. As the user interacts with the web page content 152 using the browser 112, these interactions can be tracked as interaction data 114, which is received by the recommendation module 132. Such interactions may, for example, represent position information such as the scroll position of a browser window containing a portion of the web page content 152, or the window coordinates of a portion of the web page content 152 corresponding to the user's eye fixation position, as detected by the eye tracking device 120. The interaction data 114 can include, in addition to position information, the amount of time the user dwells at each position in the web page content 152. For example, the interaction data 114 may represent the position corresponding to Section 2 of the example three-section document mentioned above and information about how much time the user dwells at that position. A relatively long dwell time (e.g., ten seconds or longer) may be more indicative that the user is reading the content at that position than a relatively short dwell time (e.g., less than five seconds), which is more indicative that the user is skimming or skipping that content. This interaction data 114 can thus be used to infer that the user is attentively reading the portion of the web page content 152 located at or near the position based on the dwell time or other factors. In turn, the keyword extracting engine 134 can extract one or more keywords from the respective portion of the web page content 152 for use by the recommendation engine 136 in obtaining or generating the recommended marketing content 116. In some cases, at least some of the recommended marketing content 116 can include the marketing content 142 or modifications thereof. In some embodiments, one or more predefined weights 138 can be fed to the recommendation engine 136. The weight(s) 138 can be used to vary the proportion of recommended marketing content 116 that is obtained from the portions of the web page content 152 that the user is currently reading, has previously read, and has not read carefully or at all (e.g., skimmed or ignored content).

An example of such weight(s) 138 is described in further detail below with respect to FIG. 3.

Figure 2:
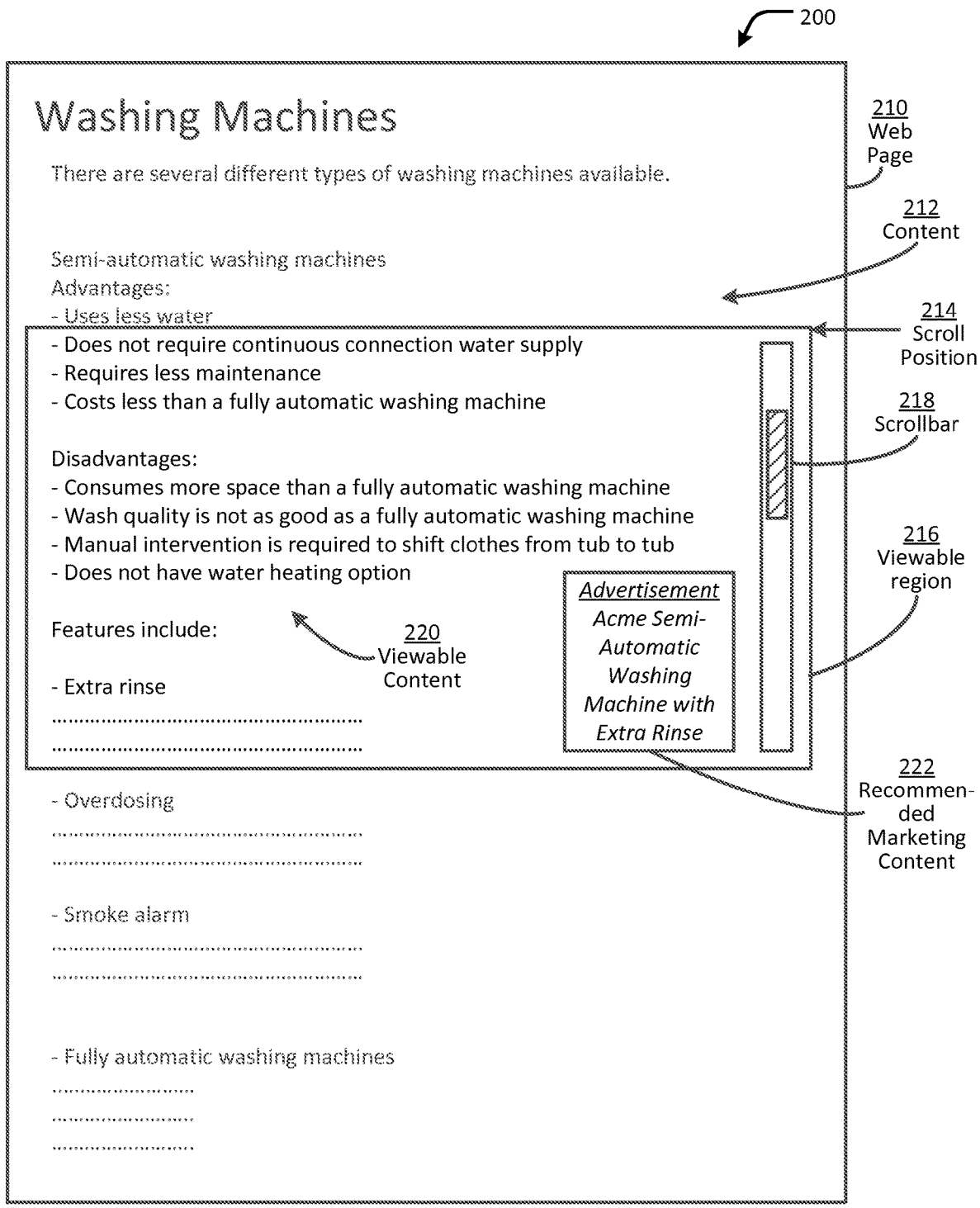
FIG. 2 is an example graphical user interface configured for use in conjunction with various embodiments of the present invention.

FIG. 2 depicts an example graphical user interface (GUI) 200 configured for use in conjunction with various embodiments of the present invention. The GUI 200 may, for example, be provided to a user via the browser 112 of FIG. 1. The GUI 200 can display at least a portion of content 212 on a web page 210. The content 212 may, for example, be obtained from the web page content 152 of FIG. 1. A scroll position 214 defines the top of a viewable region 216 of the web page 210, in which a scrollbar 218 and viewable content 220 is visible within the GUI 200. Portions of the content 212 outside of the viewable region 216 are not visible within the GUI 200. The scroll position 214, and consequently the viewable region 216 and viewable content 220, can be changed by, for example, moving the scrollbar 218 using an input device, such as a mouse, keyboard or touch screen input. The GUI 200 can be configured to display recommended marketing content 222 within the viewable region 216.

In some embodiments, the viewable content 220 can be used as the basis for generating the recommended marketing content 222. Referring to the example GUI 200 of FIG. 2, the web page 210 includes content 212 relating to washing machines. The content 212 describes various types of washing machines (e.g., semi-automatic and fully automatic) as well as advantages, disadvantages and features of each type. As can be seen in FIG. 2, due to the depicted scroll position 214, the viewable content 220 includes some of the advantages, disadvantages and features of the semi-automatic type of washing machines, while other portions of the web page 210 are not displayed within the viewable region 216. The viewable content 220 represents the portion of the content 212, or web page 210, that the user is currently reading. This information (e.g., data representing the scroll position 214 or the viewable content 220) may, for example, be sent as interaction data 114 to the recommendation module 132 of FIG. 1 for processing. For instance, the keyword extraction engine 134 can generate one or more keywords based on some or all of the viewable content 220 (e.g., "extra rinse") as determined by the interaction data 114. Using those keywords, the recommended marketing content 222 can be retrieved (e.g., from the marketing content 142 of FIG. 1) and presented to the GUI 200 for display. For example, the marketing content 142 can be searched (e.g., using the recommendation engine 136) to locate and retrieve recommended marketing content (e.g., such as indicated at 116 in FIG. 1) that is relevant to the keyword(s) (e.g., an advertisement for a washing machine with an extra rinse feature). In some cases, the keywords can be a subset of the keywords of entire page of content 212 or a subset of the viewable content 220. The keywords used to search for the recommended marketing content 222 do not necessarily include all keywords within the content 212 or viewable content 220. In other words, at least one keyword of the content 212 or viewable content 220 may not be used to search for the marketing content 142, or all keywords related to certain portions of the content 212 or viewable content 220 may not be used to search for the marketing content 142 (e.g., only the keywords associated with the identified portion are used to the exclusion of keywords in the unidentified portion). The recommended marketing content 222 can then be provided to the user via the GUI 200. The GUI 200 can be configured to display the recommended marketing content 222 within the viewable region 216 (e.g., within a white space or overlaying the viewable content 220), such as depicted in FIG. 2, or in a separate window of the web browser or in a separate document (e.g., an e-mail, a PDF, or a Word document). Other techniques for presenting the recommended marketing content 222 will be apparent in view of this disclosure. In some cases, the recommended marketing content 222 can include text, graphics, animations, audio, videos, hyperlinks, browser scripts, interactive features or any other type of suitable content.

In some embodiments, as the user changes the scroll position 214, the recommended marketing content 222 can be updated, amended, expanded, revised or otherwise modified to reflect the corresponding change in viewable content 220. Referring again to the example of FIG. 2, for instance, if the scroll position 214 changes such that the portion of the web page 210 including content about "overdosing" or "smoke alarm" comes within the viewable region 216, the recommended marketing content 222 may be changed to include an advertisement or other information that refers to "overdosing" or "smoke alarms" for semi-automatic washing machines, or washing machines in general. In some other embodiments, the recommended marketing content 222 may be expanded to include one or more advertisements or other information that refer to "extra rinse," "overdosing," "smoke alarms," or any combination of these.

In some embodiments, the recommendation engine 136 can be configured to obtain the recommended marking content 116 by evaluating the viewable content 220 for keywords. Such evaluating may include, for example, selecting one or more words appearing in the viewable region 216 of the GUI 200 for some period of time (e.g., ten seconds or longer). Such a period of time can vary and be selected upon the assumption that the longer a user dwells on the viewable content 220 (e.g., without changing the scroll position 214 such that the viewable content 220 is replaced by different portions of the content 212), the more likely it is that the user is carefully reading some or all of the viewable content 220. This is as opposed to short dwell times, in which it is more likely that the user is skimming, skipping or otherwise ignoring the viewable content 220. In yet some other embodiments, the recommendation engine 136 can be configured to evaluate the viewable content 220 for keywords by receiving interaction data 114 from the eye tracking device 120 of FIG. 1. Such interaction data 114 may represent, for example, the pixel coordinates of the GUI 200 at which the user's eyes are fixated. These coordinates can then be used to determine which portions of the viewable content 220 (e.g., which words or images) the user is reading, and generate one or more keywords based on those specific portions of the viewable content. Other examples will be described below with respect to FIG. 3.

Example Methodologies

Figure 3:
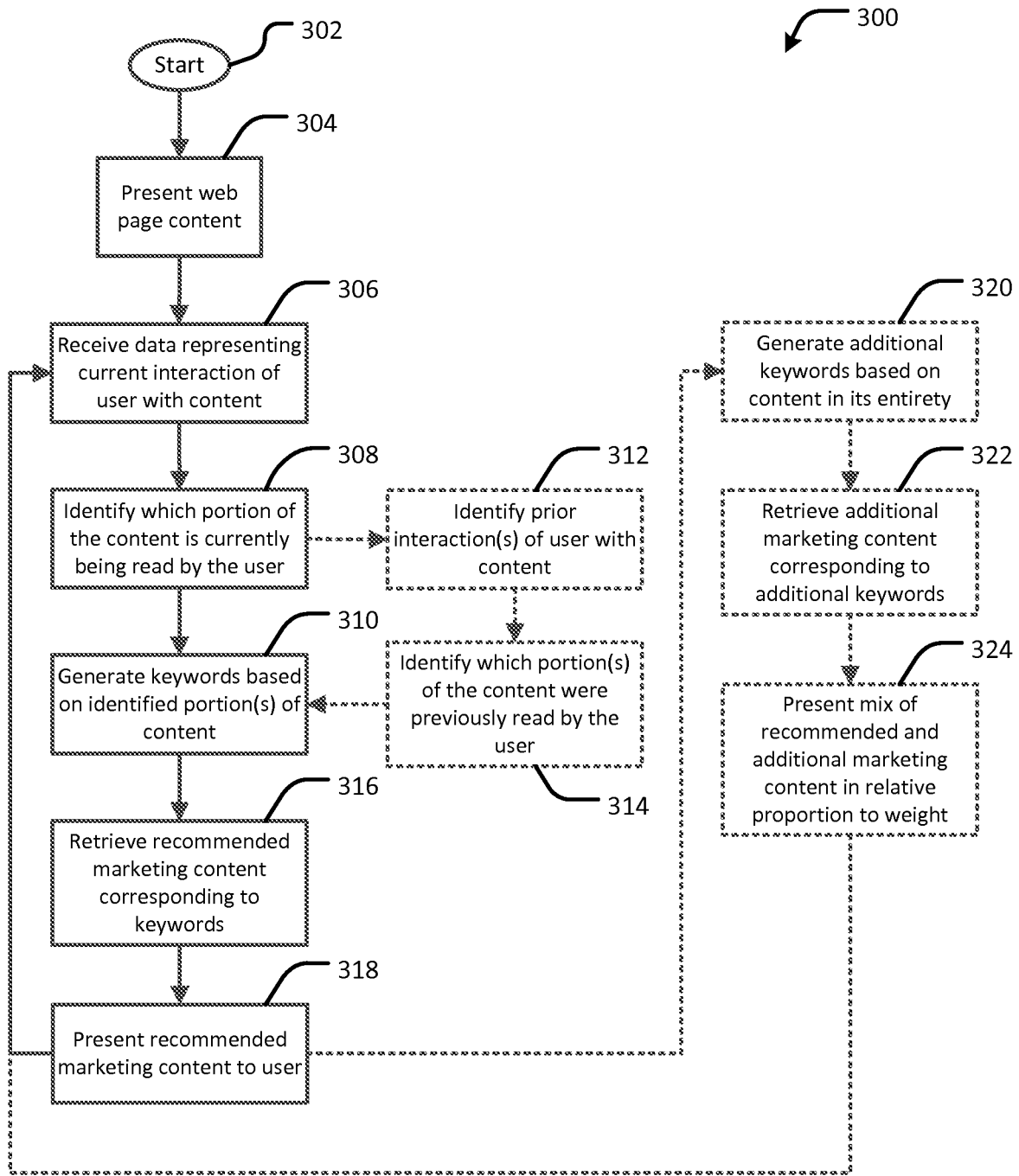
FIG. 3 is a flow diagram representative of an example methodology for targeted marketing using dynamically varied recommendations, in accordance with an embodiment of the present invention.

FIG. 3 is a flow diagram of an example methodology 300 for targeted marketing using dynamically varied recommendations, in accordance with an embodiment. The example methodology 300 may, for example, be implemented by the recommendation module 132 of FIG. 1. The method 300 begins at block 302. The method includes presenting 304 web page content (e.g., the web page content 152 of FIG. 1) to a user via a web browser (e.g., the browser 112 of FIG. 1). The method continues by receiving 306 data representing a current interaction of the user with the web page content in response to presenting the web page content. The current interaction can be any type of information describing an interaction of the user with the web browser. For example, as described above with respect to FIG. 2, the current scroll position of the browser can be a current interaction. In another example, the coordinates of the browser window upon which the user's eyes are fixed, as determined by an eye tracking device (e.g., the eye tracking device 120 of FIG. 1) can be a current interaction.

The method 300 continues by identifying 308 which portion of the web page content is currently being read by the user based on the current interaction. For example, the portion of the web page content can be identified by the current scroll position of the browser, from which the viewable content of the browser can be determined, or by the browser coordinates of eye fixation, as mentioned above. The method 300 continues by generating 310 one or more keywords associated with the identified portion of the web page content. For example, the keyword(s) can be generated by extracting text from the identified portion of the web page content, or by using keywords that are tagged on the web page (e.g., using HTML tags). In another example, the keyword(s) can be generated using a natural language processing library, in which patterns of words in the identified portion of the web page content can be matched with tags in the library. In yet another example, the keyword(s) can be generated using a statistical autotagging service (e.g., a service that generates tags based on the frequency or location of words and terms appearing in a given set of content). In some embodiments, the method 300 can continue by identifying 312 one or more prior interactions of the user with the web page content. For example, if the user reads page one of the web page content, and then reads page two, the prior interaction with page one can be stored for future use. In such embodiments, the method 300 continues by identifying 314 which portions of the content were previously read by the user, in addition to, or alternatively to, identifying 308 which portion of the web page content is currently being read by the user (e.g., pages 1 and 2).

The method 300 continues by retrieving 316 recommended marketing content (e.g., the recommended marketing content 142 of FIG. 1) corresponding to the keywords, and presenting 318 the recommended marketing content to the user via an electronic medium, such as a web page displayed in a browser, a Word document, a PDF document, a video, a text message, as audio message, or an e-mail. The method 300 can continue by repeating the receiving 306, identifying 308, generating 310, retrieving 316 and presenting 318 steps indefinitely.

In another embodiment, the method 300 continues by generating 320 one or more additional keywords based on the web page content in its entirety, as opposed to merely generating keywords based on the content currently being read by the user. In this embodiment, the method 300 continues by retrieving 322 additional marketing content corresponding to the additional keywords, and presenting 324 a mix of the recommended marketing content and the additional marketing content to the user via the web browser in relative proportion to one or more predefined weights (e.g., the weight 138 of FIG. 1). Such predefined weights may, for example, be defined by a marketer, vendor, or advertising agency. In an example use case, a first predefined weight may be associated with web page content that the user is currently reading, a second predefined weight may be associated with web page content that the user previously read, and a third predefined weight may be associated with the entirety of the web page content (e.g., both read and unread content). A specific example is that the first, second and third predefined weights are 40%, 40%, and 20% respectively. In this case, 40% of the recommended marketing content may include ads or other content that correspond to keywords generated from the content currently being read, 40% ads/content that correspond to keywords generated from the previously read content, and 20% ads/content that correspond to keywords generated from the web page as a whole (both read and unread content). It will be understood that the weights can be predefined in any suitable proportion to each other (e.g., 70% currently reading/30% entire content, 60% currently reading/40% previously read, 45% currently reading/25% previously read/30% entire content, 100% currently reading, etc.).

As mentioned above, in some embodiments, the portion of the web page content currently being read by a user can be identified by tracking the browser coordinates of eye fixation (e.g., the position within the browser window that the user's eye is looking at). Such coordinates can correspond with, for example, horizontal text being displayed by the browser. Using eye tracking hardware and software, the number of fixations on the page, and the coordinates of those fixations, can be obtained. Of those fixations, ones having a fixation time of between approximately 100 and 500 milliseconds, with an average of 250 milliseconds, may be of primary interest, although it will be understood that other fixation times may be considered as appropriate. Based upon the coordinates of those fixations, the difference in coordinates (delta x and delta y) for two consecutive fixations can be calculated. Delta x can be compared to a horizontal threshold value, and delta y can be compared to a vertical threshold value. A delta x that exceeds the horizontal threshold value and a delta y that does not exceed the vertical threshold value, or is close to zero, indicates that the user is reading a line of text. As such, regions of the browser display corresponding to relatively high concentrations of fixations may include content that the user is currently reading.

Example Computing Device

Figure 4:
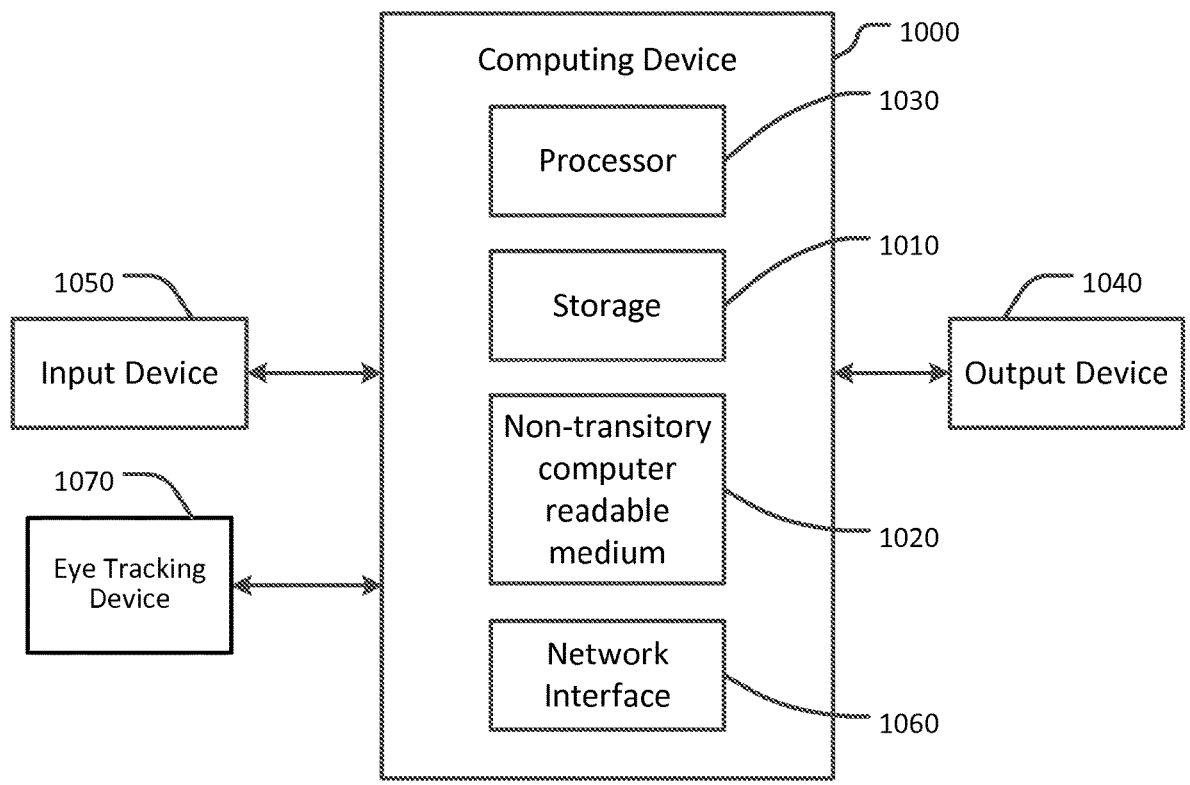
FIG. 4 is a block diagram representing an example computing device that may be used in accordance with an embodiment of the present invention.

FIG. 4 is a block diagram representing an example computing device 1000 that may be used to perform any of the techniques as variously described in this disclosure. For example, the user computing system 110, server 130, content providers 140, 150, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010, non-transitory computer-readable media 1020, or both, having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions, software, or both, that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010, non-transitory computer-readable media 1020, or both, and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements, information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as an eye tracking device 1070. The computing device 1000 can include or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the browser 112, recommendation module 132, the keyword extracting engine 134, and the recommendation engine 136, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors or databases in different configurations and arrangements, and that the depicted embodiments are not intended to be limiting. Various components of this example embodiment, including the computer 110, the server 130, and the content providers 140, 150, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including presenting web page content (e.g., via a web browser); receiving data representing a current interaction of a user with the web page content in response to presenting the web page content; identifying which portion of the web page content is currently being read or interacted upon by the user based on the current interaction; generating keywords associated with the identified portion of the web page content; retrieving recommended marketing content corresponding to the keywords; and presenting the recommended marketing content via an electronic medium. In some cases, the process includes generating additional keywords based on the web page content in its entirety; retrieving additional marketing content corresponding to the additional keywords; and presenting a mix of the recommended marketing content and the additional marketing content in relative proportion to a predefined weight. In some cases, the process includes identifying a prior interaction of the user with the web page content based at least in part on the data; and identifying which portion of the web page content was previously read by the user based on the prior interaction, where the generated keywords are based on the identified portions of the web page content that are currently being read by the user and were previously read by the user. In some cases, the process includes receiving a current scroll position within the web browser, where the interaction is tracked based at least in part on the current scroll position. In some cases, the process includes receiving a current eye tracking position within the web browser, where the interaction is tracked based at least in part on the current eye tracking position. In some cases, the generating of the keywords includes applying natural language processing to the identified portion of the web page content. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
receiving digital content via a web browser;
displaying, on a display device, a first portion of the digital content in the web browser;
detecting a plurality of eye fixation locations on the displayed digital content using an eye tracking device, each eye fixation location represented by (x, y) coordinates;
receiving, by a processor, from the eye tracking device, data representing the plurality of eye fixation locations;
identifying multiple pairs of two consecutive eye fixation locations having a difference in coordinates ($\Delta x$, $\Delta y$) such that $\Delta x$ is greater than a horizontal threshold value and $\Delta y$ is less than a vertical threshold value, wherein the horizontal and vertical threshold values are indicative of a user reading a line of text in the digital content;
identifying a second portion of the digital content that corresponds to the identified multiple pairs of eye fixation locations;
generating keywords associated with the identified second portion of the digital content;
retrieving recommended content corresponding to the keywords; and
presenting the recommended content via the web browser.

2. The method of claim 1, further comprising:
generating additional keywords based on the digital content in its entirety;
retrieving additional recommended marketing content corresponding to the additional keywords; and
presenting a mix of the recommended content and the additional recommended content in relative proportion to a weight.

3. The method of claim 1, further comprising:
identifying a prior interaction of the user with the digital content; and
identifying a third portion of the digital content that was previously displayed to the user based on the prior interaction,
wherein the third portion of the digital content was displayed to the user for a dwell time that is greater than a threshold dwell time, and
wherein the generated keywords are associated with the third portion of the digital content.

4. The method of claim 1, further comprising receiving a current scroll position within the web browser, wherein the identified second portion of the digital content includes the current scroll position.

5. The method of claim 1, wherein the second portion of the digital content has a concentration of eye fixation locations greater than a concentration threshold.

6. The method of claim 1, wherein generating the keywords includes applying natural language processing to the identified second portion of the digital content.

7. The method of claim 1, wherein the digital content is at least one of a web page, an electronic mail message, and an electronic document.

8. A system comprising:
a display;
an eye tracking device configured to determine where on the display a user's eyes are fixated, and to generate (x, y) coordinates based on such determination;
a storage; and
a processor operatively coupled to the storage, the processor configured to receive coordinates from the eye tracking device and execute instructions stored in the storage that when executed cause the processor to carry out a process comprising:
receiving digital content via a web browser;
displaying a first portion of the digital content in the web browser;
receiving data generated by the eye tracking device that represents a plurality of eye fixation locations on the displayed digital content, wherein the eye fixation locations are (a) associated with a fixation time within a specified range, and (b) within a second portion of the digital content;
generating keywords associated with the second portion of the digital content;
retrieving recommended marketing content corresponding to the keywords; and
presenting the recommended marketing content via the web browser.

9. The system of claim 8, wherein the process includes:
generating additional keywords based on the digital content in its entirety;
retrieving additional recommended marketing content corresponding to the additional keywords; and
presenting a mix of the recommended marketing content and the additional recommended marketing content in relative proportion to a weight.

10. The system of claim 8, wherein the process includes:
identifying a prior interaction of a user with the digital content; and
identifying a third portion of the digital content that was previously displayed to the user based on the prior interaction,
wherein the third portion of the digital content was displayed to the user for a dwell time that is greater than a threshold dwell time, and
wherein the generated keywords are associated with the third portion of the digital content.

11. The system of claim 8, wherein the process includes receiving a current scroll position within the web browser, and wherein the second portion of the digital content includes the current scroll position.

12. The system of claim 8, wherein the specified range is between 100 milliseconds and 500 milliseconds.

13. The system of claim 8, wherein generating the keywords includes applying natural language processing to the second portion of the digital content.

14. A non-transitory computer program product having instructions encoded thereon that when executed by one or more processors cause a process to be carried out, the process comprising:
receiving digital content via a web browser;
displaying, on a display device, a first portion of the digital content in the web browser;
detecting a plurality of eye tracking positions within the web browser using an eye tracking device, each eye tracking position represented by (x, coordinates;

receiving, from the eye tracking device, (x, y) coordinates of a first eye tracking position that defines the first portion of the digital content, wherein the first portion of the digital content is displayed for a first dwell time;

receiving data representing a current interaction of a user with the digital content via the web browser, wherein the current interaction is a scrolling operation;

receiving, from the eye tracking device, (x, y) coordinates of a second eye tracking position that defines a second portion of the digital content, wherein the second portion of the digital content is displayed for a second dwell time;

identifying a portion of the digital content that is displayed for a dwell time that is greater than a threshold dwell time;

generating keywords associated with the identified portion of the digital content;

retrieving recommended content corresponding to the keywords; and presenting the recommended content via the web browser.

15. The non-transitory computer program product of claim 14, wherein the process includes:

generating additional keywords based on the digital content in its entirety;

retrieving additional recommended content corresponding to the additional keywords; and presenting a mix of the recommended content and the additional recommended content in relative proportion to a weight.

16. The non-transitory computer program product of claim 14, wherein the process includes:

identifying a prior interaction of the user with the digital content; and identifying a third portion of the digital content that was previously displayed to the user based on the prior interaction, wherein the third portion of the digital content was displayed to the user for a third dwell time that is greater than the threshold dwell time, and wherein the generated keywords are associated with the third portion of the digital content.

17. The non-transitory computer program product of claim 14, wherein the process includes receiving a current scroll position within the web browser, and wherein at least one of the first and second portions of the digital content includes the current scroll position.

18. The non-transitory computer program product of claim 14, wherein the first and second eye tracking positions are each associated with a fixation time between 100 milliseconds and 500 milliseconds.

19. The non-transitory computer program product of claim 14, wherein generating the keywords includes applying natural language processing to the identified portion of the digital content.

20. The non-transitory computer program product of claim 14, wherein the digital content is at least one of a web page, an electronic mail message, and an electronic document.

* * * * *